(12) United States Patent
Schofield

(10) Patent No.: US 7,047,460 B1
(45) Date of Patent: May 16, 2006

(54) METHOD AND APPARATUS FOR TESTING A STORAGE INTERFACE

(75) Inventor: Steven Richard Schofield, Middleton, ID (US)

(73) Assignee: Cypress Semiconductor Corporation, San Jose, CA (US)

( * ) Notice: Subject to any disclaimer, the term of this patent is extended or adjusted under 35 U.S.C. 154(b) by 636 days.

(21) Appl. No.: 10/179,813

(22) Filed: Jun. 24, 2002

(51) Int. Cl.
*G11C 29/00* (2006.01)

(52) U.S. Cl. .................................. 714/718; 714/741
(58) Field of Classification Search ............... 714/718, 714/741; G11C 29/00
See application file for complete search history.

(56) References Cited

U.S. PATENT DOCUMENTS

2004/0039969 A1* 2/2004 Pratt et al. ................. 714/42

OTHER PUBLICATIONS

Magnusson, P., Werner, B.; Efficient memory simulation in SimICS; Swedish Inst. of Comput. Sci., Kista, Sweden; This paper appears in: Simulation Symposium, 1995. Proceedings of the 28th Annual; Apr. 9-13, 1995; pp. 62-73□□.*
IVP Generator; IBM Technical Disclosure Bulletin, Mar 1. 1991, vol. 33, Issue No. 10A, pp. 314-315.*
ATA/ATAPI-6, Draft Specification Revision 3a Dec. 14, 2001 (provided on CD ROM).

* cited by examiner

*Primary Examiner*—R. Stephen Dildine
(74) *Attorney, Agent, or Firm*—Marger Johnson & McCollom, P.C.

(57) ABSTRACT

A tester or method of testing a mass storage interface queues error functions for simulation responsive to condition criteria of such storage simulation. Such bridge-chip tester may comprise ATA registers to receive data from an ATA or ATAPI-type interface. A main access emulator may emulate data storage processes responsive to commands of a command register of the ATA registers. A test controller may be operable to load a queue with predetermined error functions to be emulated by the tester. The queue may release error functions of the queue for emulation responsive to data of at least one of the command register and the emulator.

20 Claims, 4 Drawing Sheets

| REGISTER NAME (WRITES) | REGISTER NAME (READS) |
|---|---|
| ATA DATA | ATA DATA |
| ATA FEATURES | ATA ERROR |
| ATA SECTOR COUNT | ATA SECTOR COUNT |
| ATA SECTOR NUMBER | ATA SECTOR NUMBER |
| ATA CYLINDER LOW | ATA CYLINDER LOW |
| ATA CYLINDER HIGH | ATA CYLINDER HIGH |
| ATA DEVICE/HEAD | ATA DEVICE/HEAD |
| ATA COMMAND | ATA STATUS |
| ATA DEVICE CONTROL | ATA ALT STATUS |

| CODE | DESCRIPTION | SUB-CODE |
|---|---|---|
| 0 | INDEPENDENT OF CODE | NA |
| 1 | ATA COMMAND | COMMAND VALUE |
| 2 | ATAPI COMMAND | COMMAND VALUE |
| 3 | SRST | NA |

FIG.5

| FUNCTION VALUE | DESCRIPTION | SUB-FUNCTION |
|---|---|---|
| 0 | NO FAILURE WILL BE ISSUED | NA |
| 1 | NO POLLING | NA |
| 2 | SET/CLEAR BUSY BIT | 1/0 |
| 3 | SET/CLEAR DRQ BIT | 1/0 |
| 4 | SET/CLEAR ERROR BIT | 1/0 |
| 5 | FORCE THE CYLINDER HIGH SIGNATURE TO BE BAD | NA |
| 6 | FORCE ATAPI PHASE TO BE DATA WHEN EXPECTING COMMAND PHASE | NA |
| 7 | alt_stat_error | COUNT |
| 8 | int_reason_error | COUNT |

FIG.6

METHOD AND APPARATUS FOR TESTING A STORAGE INTERFACE

BACKGROUND

The present invention relates to testing devices that may be used to communicate with an interface of a mass storage device such as an Advanced Technology Attachment (ATA) interface or to an ATA Packet Interface (ATAPI) type device. More particularly, this disclosure may relate to testing of a bridging device, which may be used to bridge, for example, a Universal Serial Bus (USB) to a ATA/ATAPI interface.

Available guidelines suggest standards for interfacing storage devices. For example, ATA/ATAPI-6, NCITS Draft specification T13/1410D, Revision 3A, Dec. 14, 2001, available from the American National Standards Institute and hereby incorporated by reference in its entirety, establishes ATA/ATAPI standards that may be used to interface storage devices. Such standards may provide a protocol for how to pass commands to a storage device and how these commands may be interpreted and dealt with.

Storage devices of an ATA type interface may include, for example, hard drives, or removable media drives—e.g., disk drives, flash memory card interfaces, micro-drives and the like—those that may not support packet-type transfers. Storage devices of an ATAPI type interface may include, for example, CD-ROMs, CD-Recordable, CD-RW, DVD, tape drives, super-floppy drives, some ZIP drives and the like. Generally, when a host Operating System (OS) needs to access an ATA/ATAPI device, an OS Basic Input/Output System (BIOS), or other Input/Output (I/O) subsystem, may obtain an access command and pass the command to the storage device.

In some data communication systems, a bridge may translate a protocol of one bus to another protocol for accessing an ATA/ATAPI type storage device. Such a configuration may be established to allow system expansion to external portable drives. For example, a Universal Serial Bus (USB) may carry USB communications having ATA/ATAPI information carried or encapsulated therein. The bridge may receive the USB communications and decipher ATA/ATAPI commands therefrom for accessing the storage device.

To assure proper functionality of such ATA/ATAPI type bridges, it may be helpful to test these bridges and the mass storage interface under various conditions.

SUMMARY

Exemplary embodiments of testers and methods of testing a mass storage interface may include queuing error functions that are to be simulated responsive to predetermined condition criteria.

A method of testing a bridge-chip that is to communicate with an ATA/ATAPI mass storage device may include simulating the mass storage at an ATA/ATAPI interface of the bridge-chip. Error functions of the storage device may be emulated responsive to certain commands or conditions of the simulated mass storage device.

In accordance with further embodiments, multiple error functions may be queued for emulation. The error functions may be performed sequentially or together responsive to predetermined operations of the testing and emulation. In such embodiments, condition criteria associated with the error functions may include criteria of a command register of ATA registers or of a procedure for emulating the data storage access.

In another embodiment, a bridge-chip tester comprises ATA registers to receive data from an ATA or ATAPI-type interface. An emulator may emulate data storage access responsive to commands of the command register. A test controller may be operable to load a queue with predetermined error functions that are to be emulated by the tester. The queue may release error functions of the queue for emulation responsive to data of at least one of the command register and the emulator when corresponding to the associated condition criteria.

BRIEF DESCRIPTION OF DRAWINGS

The present disclosure may be best understood with reference to the accompanying drawings identified below.

FIG. 5 is a table showing codes and sub-codes that may be available as condition criteria for conditioning emulation functions of the drive mode.

FIG. 6 is a table showing different functions that may be emulated by the drive model.

DETAILED DESCRIPTION

In the following description, numerous specific details are set forth to provide an understanding of exemplary embodiments of the present invention. It will be understood, however, that alternative embodiments may comprise sub-combinations of the disclosed exemplary embodiments.

Additionally, readily established circuits of the exemplary embodiments may be disclosed in simplified form (e.g., block diagram style) to avoid obscuring an essence of the embodiments with excess detail.

Figures 1, 2:
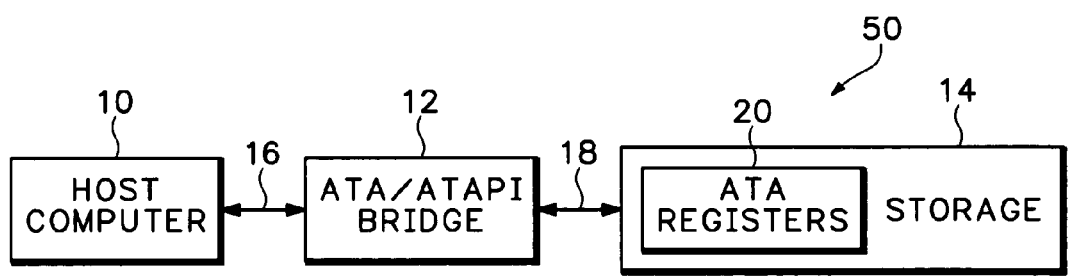
FIG. 1 is a table showing various ATA registers that may be associated with read or write storage operations.
FIG. 2 is a schematic block diagram illustrating a system comprising a host communicating with a storage device through a bridge.

FIG. 1 is a table showing read and write ATA registers of an ATA device. FIG. 2 is a schematic block diagram illustrating a data processing system 50 having a host 10 to communicate with storage device 14 by way of ATA/ATAPI bridge 12. Referring to FIGS. 1 and 2, ATA/ATAPI Interface 18 may access storage device 14 by way of ATA registers 20. These registers 20 may physically reside inside such ATA/ATAPI storage device 14. Bridge 12 may access the storage device 14 by writing certain registers 20 with, for example, data transfer information. The data may include, e.g., information for the location of the desired data and a request to wait until certain values are read from another register such as the ATA Status register. Likewise, other storage device operations such as SET FEATURES, IDENTIFY DEVICE, etc., might be performed in similar manner.

Configuration and operation of such ATA registers 20 is known to those skilled in the art and may be further described, for instance, within the above referenced ATA/ATAPI draft specification.

Data may be stored in ATA/ATAPI storage devices 14 through write commands and retrieved through read commands. The signals for creating these reads and writes may be controlled by a Basic Input/Output System (BIOS) of an Operating System (OS) or other Input/Output (I/O) subsystem. The timing of the signals may be determined by interface hardware. The ATA/ATAPI specification may specify how fast these signals should be asserted or deasserted. The specification may also establish inter-relationships of these various signals, which may depend upon a particular operating mode, such as, for example, Programmed Input/Output (PIO) or Direct Memory Access (DMA).

Further referencing FIG. 2, bridge 12 may translate a protocol of bus 16 to that of ATA/ATAPI interface 18 for accessing storage device 14. Bridge 12 may receive ATA/ATAPI information that may be carried or embedded with USB communications of bus 16. Bridge may decipher these communications and pass ATA/ATAPI commands to ATA/ATAPI storage device 14.

In accordance with an exemplary embodiment of the present invention, an ATA/ATAPI bridge may be tested to verify its operation under different error conditions of a simulated storage device. In such embodiment, a test circuit and method of operation may simulate the behavior of an ATA or ATAPI mass storage device.

In some cases, it may be helpful to consider how a state machine of an ATA/ATAPI device might be used to perform procedures of a command register, progress operations of a mass storage device and return information to status registers responsive to such operations. For example, the state machine may be given a command to carry out a data transfer procedure of the protocol. Accordingly, a simulator of a test circuit may interact with the ATA registers in a manner simulating operations of a mass storage device as it might otherwise be implemented by an operational state machine.

Figure 3:
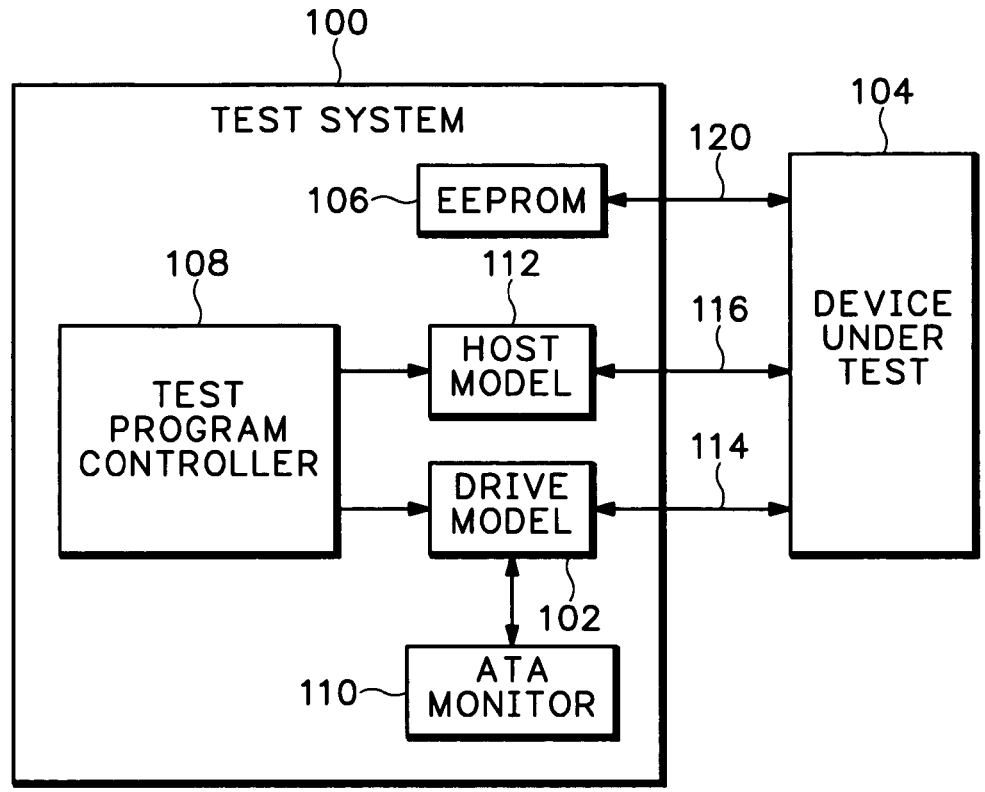
FIG. 3 is a schematic block diagram of a test system to test an ATA/ATAPI interface of a bridge-chip.

Referencing FIG. 3, a test system 100 comprises a host model 112 and drive model 102 to emulate an operating environment for a device under test—e.g., such as a USB-to-ATA/ATAPI bridge device. Programmable device 106 may be configured to establish possible configuration data of the DUT. For example, a USB-to-ATA/ATAPI bridge may need to know a particular environment of its application. The configuration data may inform the bridge of the given environment, and thus allow it to establish a communication configuration appropriate for such environment. If the test system is to emulate an ATAPI type device, such as a DVD drive, then the programmable device (EEPROM) 106 may be programmed to establish signals 120 representative of such type drive. In another embodiment, the programmable device may be programmed to establish ATA type operations as though the bridge or DUT is to interact with a hard drive.

Although, not shown specifically in FIG. 3, it is understood that test program controller 108 may have access to information associated with the programming of programmable device 106. Therefore, test program controller 108 may configure host model 112 and drive model 102 appropriately to emulate the environment specified by configuration signal 120 of programmable device 106. In other words, if the programmable device is establishing configuration signals representative of a CD-ROM drive environment, then the test program controller 108 may configure host model and drive model appropriately to emulate procedures and operations associated with accessing a CD-ROM drive.

As used herein, the description of a bridge may be made with reference to a USB-to-ATA/ATAPI type bridging device. It will be understood, however, that the application may be associate with other types of bus translators to a mass storage device. For example, the bridge might be of an Advanced Microcontroller Bus Architecture (AMBA)-to-ATA/ATAPI; firewire-to-ATA/ATAPI; or other such bridging arrangement for translation to an attachment interface of a memory device.

Additionally, it may be noted that programmable device 106 and host model 112 may be optional for certain other embodiments. For such embodiments, the remainder of the test system may monitor the ATA/ATAPI 114 interface and determine operations of the DUT while emulating operations of a mass storage device.

For example, during an initialization procedure of a mass storage device, the mass storage device may not require interaction with a host. Instead, mass storage device and bridge-chip may interact directly with one another, e.g., through a given power-up sequence, absent involvement with the host. Thus, to test such initialization operability, test system 100 may emulate (via drive model 102) simply the operations of a storage device (e.g., of a power-up initialization sequence) alone. Although the initialization procedure is mentioned as one example of a stand-alone test procedure (i.e., absent host interactions); other embodiments may emulate similar stand-alone procedures, e.g., such as a method of handling or resolving an error message.

In exemplary embodiments, test system 100 may emulate errors of a mass storage device and test how DUT 104 may process such errors. In these embodiments, error commands for signaling error(s) to be emulated may be queued and initiated dependent on conditions of emulated ATA registers and/or conditions of emulated data-handling of the simulated mass storage. The test system, thus, may emulate how a hard-drive, e.g., might interface to a bridge device.

Additionally, in further embodiments, test system may verify proper operations of the DUT 104 responsive to commands of a host. Host model 112 may send commands—e.g., USB commands—to the DUT as though requesting operations of an ATA/ATAPI storage device. ATA monitor may check signals of the ATA/ATAPI interface to verify appropriate timing relationship per an ATA/ATAPI specification responsive to the requested operations. If a signal is out of specification, monitor may generate an error signal representing that such time parameter may be out of spec.

The test system may also verify that DUT 104 establishes proper ATA/ATAPI communications with the emulated storage device responsive to host initiated operations. For example, the monitor may verify that the ATA/ATAPI communications include error and status register checks pursuant a write or read request. It might also verify appropriate delays while busy bits remain active or while waiting activation of a ready signal. Accordingly, the test system may be operable to manipulate error or status registers of the emulated storage device before, during or near conclusion of such host initiated operations.

Figure 4:
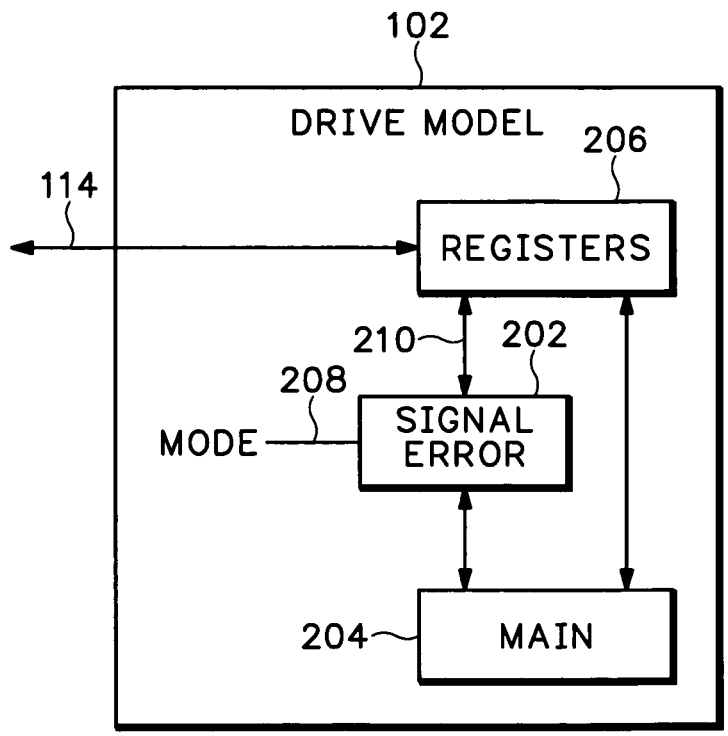
FIG. 4 is a schematic block diagram of a drive model to emulate a mass storage device at an ATA/ATAPI interface.

Referencing FIG. 4, ATA registers 206 of drive model 102 may be coupled to the ATA/ATAPI interface 114 to receive information of a host or also configuration information of an EEPROM of the test system. The ATA registers may interact with main emulator 204, e.g., which may handle commands of a command register (FIG. 1). Main emulator 204 will emulate mass storage access operations responsive to commands of the command register. When the main emulator 204 returns communications to the registers, it may pass back accompanying information to the ATA registers 206. Main emulator 204 essentially simulates the mass storage operations.

Signal error circuitry 202 may receive mode inputs from the test system. The mode inputs may include information of the individual tests to be performed. Test program controller 108 of FIG. 3 may issue these mode commands for queuing within the signal error circuitry 202. The signal error circuitry may receive a plurality of error commands or functions, which may be queued-up for release based on certain condition criteria of drive model 102. The test program controller 108 may also act upon host model 112 to request issuance of commands to the drive model, e.g., via DUT 104. But principally, in this embodiment, the drive model may receive mode information e.g., which may be acted upon to indicate that every thing is OK, to see if commands are coming through, or to effect a desired error condition.

For example, the test program controller may call for a standard write procedure to be accompanied with a report of an error by the emulated storage device. The host may receive instructions from the test program controller to issue a write procedure. DUT will receive the information from the host and forward this write procedure request to the ATA registers 206 of drive model 102. Main emulator 204 may obtain information from the command register regarding the standard write procedure and may begin emulation of the procedure as though acting to store data. Signal error circuitry 202 may be queued-up with an error function for signaling an error. When the appropriate circumstances are presented, the signal error circuitry may place the error information within the write procedure.

For example, the signal error circuitry may write an error bit of an error register of the ATA registers 206 upon determining an appropriate write back exchange between the main emulator 204 and the ATA registers 206. Alternatively, the signal error circuitry 202 may effect an error within the data storage emulation of the main emulator 204. The emulated data storage being performed by within the main emulator 204 may not be presenting the error information back to the ATA registers or the DUT until subsequent activities associated with the data storage emulation. By waiting for such procedure conditions of the main emulator, the signal error circuitry may control where, when and how to interject such types of errors.

Additionally, the signal error circuitry may queue up sequential error functions. For example, a command may come down to the ATA registers and cause main emulator 204 to respond to the command. A first condition criteria may be found to allow signal error circuitry to set an error bit in the error register. Monitor 110 (e.g. of a test system 100 of FIG. 3) may then track handling of the error by DUT 104. Upon confirming that a given command has been performed, the signal error circuitry may queue-up another error function within the queue for subsequent execution. The subsequently queued error function might then be conditioned upon similar condition criteria. Alternatively, it might be associated with second condition criteria different from the first. In such alternative, the second queued error could be released by conditions of the ATA registers and/or procedures of main emulator 204 that could become effective just after performance of the previously released error function.

In a particular example, the DUT 104 and drive model 102 may begin an initialization procedure independent of host model 112. The DUT 104 may ask for identification data. If the identification request fails, or goes unanswered, the DUT and drive model may perform a series of subsequent commands to sort out the difficulty. Such a sequence may include, e.g., instructions to define the product, steps to program the product, a process to establish a pin set, skip pin reset, establish as a packet operable device, identify packet vendor specific commands, etc. Accordingly, the signal error circuitry, in accordance with exemplary embodiments of the present invention, may allow stacking of multiple functions for sequential controlled release based upon multiple and separate condition criteria. In this fashion (with reference to the state machine image as mentioned earlier herein), a variety of different scenarios may be queued into the signal error circuitry to allow steering and exercise of a DUT through a variety of different possible paths (e.g., of the processing state machine), which may be associated with the exemplary initialization sequence.

Further referencing FIG. 4, the communication link 210 between signal error circuitry 202 and ATA registers 206 may be bi-directional. This allows the ATA registers to clear error commands once they have been completed. The ATA registers 206 may send a signal back to signal error circuitry 202 indicating command completion and to instruct it to stop signaling the error. Thereafter, the signal error circuitry may queue-up the next error function.

In accordance with further embodiments, with reference to FIGS. 3–5, the test program controller 108 of the test system 100 may load the signal error circuitry 202 of the drive model 102 with a variety of different error functions and condition criteria.

Condition criteria may comprise, e.g., those as illustrated by FIG. 5. If the code 0, for example, is input, the type of commands received from registers 206 is of no relevance. The drive model may operate independent of command register determinations. Main emulator 204 may interact with the ATA registers to simulate memory storage in accordance with the predetermined programs contained therein and responsive to the commands of the ATA registers.

In a different operative mode, another code value (e.g., 1) may be input. The signal error circuitry 202 may check the command registers for an ATA command and command value to match that which is associated with the code input. Upon finding a match, it may proceed to perform designated error functions that may be queued within the signal error circuitry in association with the coded/sub-coded condition criteria.

For example, referencing FIG. 6, the error function may queue at least one of various function(s)—i.e., no failure to be issued, no polling, set/clear busy bit, set/clear the device request bit DRQ, set/clear the error bit, force a cylinder high signature to be bad, and in the case of an ATAPI mode to set a phase to be data when expecting commands, etc. One or more of these error functions may be queued within the signal error circuitry with same or different condition criteria.

Therefore, when an ATA command of a given sub-code, e.g., a write command, is received; the code=1 and sub-code=WR once determined may drive an error function, e.g. to set an error bit. Once the error bit is performed, the error function may be cleared and a new code and sub-code condition criteria queued-up in preparation of launching the next error function(s).

In this embodiment, when the ATA command modes are being used; the condition criteria may be based on examination of the register contents directly. This is not to ignore the fact that a register load might also kick-off procedures of the main emulator as may be necessary for emulating a given data storage access procedure.

For other embodiments, the code input may be of a value 2, for signaling an ATAPI condition criteria. The signal error circuitry may then examine at least one of the registers or a subroutine condition associated with the emulation procedures of the main emulator to determine a match condition. Upon determining such match condition, the signal error circuitry may initiate the associated queued error function(s). The signal error circuitry may return the error function results to a sub-routine of the main emulator emulation procedures or to the ATA registers 206 directly.

In certain examples of ATAPI test functions, an error function may force, e.g., an ATAPI phase to be data when expecting a command. Or, the error function may force a cylinder high signature to be bad. Each of these functions might inject the error information back to the emulation procedures of main emulator 204. Continued performance of the emulation procedures may then provide the appropriate information back to registers 206 so as to emulate the reporting and/or handling such conditions.

As to another example of an ATAPI application, an ATA command (e.g., of HEX value A0) may be passed into the command register, which in turn may indicate an ATAPI packet command. Therefore, signaling of the condition criteria may need to be derived from sub-routines within the emulation procedures of main emulator 204. Emulation procedures of the main emulator 204 may dig into the data communications to find the ATAPI command value. This command value may then be sent to the signal error circuitry so that it may check for correlation with condition criteria of a queued or pending function therein.

Additionally, it may be understood that an ATAPI type error function might also affect the ATA registers (e.g., set busy bit, DRQ, error, etc.) directly; as opposed to the indirect route of returning information to the sub-routine within the emulation procedures of the main emulator 204.

Figure 7:
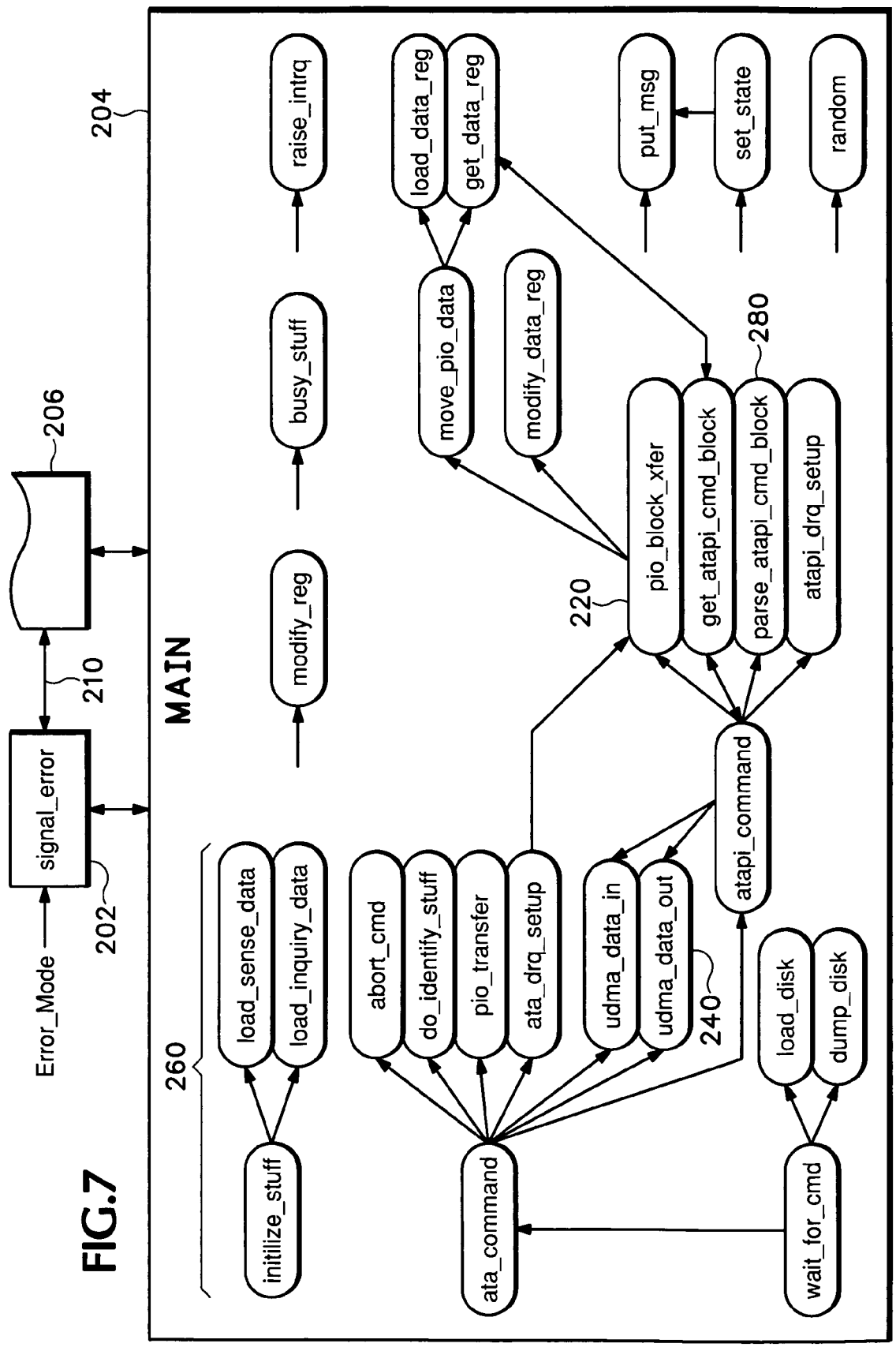
FIG. 7 is a partial simplified schematic diagram of a drive model showing examples of subroutines for emulation procedures of a main emulator.

Referencing FIG. 7, examples of procedures of the main emulator 204 may include a subroutine, e.g., to emulate programmable input or output (PIO) or ultimate direct memory access (UDMA) applications—e.g., block transfer 220 or UDMA data out 240 respectively. Should the drive model receive write commands under such conditions, ATA registers 206 may pass the application to the pre-programmed algorithms of main emulator 204. Main emulator 204 may then emulate the access of the indicated PIO or UDMA applications.

As shown by the exemplary subroutines of main emulator 204 of FIG. 7, the majority of emulation procedures may be keyed (or kicked-off) by ATA commands. These ATA commands may be fed from the ATA command register of ATA command Registration 206.

Regarding the initialization operations, these 260 may be triggered independently of ATA commands and/or the external host system. The initialization routines may be used during system power-ups.

Finally, it may be seen from the various sub-routines of main emulation 204, that ATAPI type sub-code criteria may not be fully available from the ATA register 206 alone. For example, sub-routine 280 (parse_atapi_cmd_block) may need to be performed to parse out commands of the ATAPI pocket protocol. Accordingly, the signal error circuitry may check conditions of the subroutines as part of the condition content.

In a particular application, the test program controller 108 queues the signal error circuitry 202 with single error functions associated with respective condition criteria. In other embodiments, the signal error circuitry 202 may be configured to receive multiple error functions and associated condition criteria. When an error function is released (i.e., upon determining a match with its condition criteria), the error function may be completed and the next function of the stack queued-up for subsequent performance. In such embodiment, the functions of the stack may be performed sequentially in order of arrival within the queue. It will be understood, however, that although the order has been described for this embodiment as first-in-first-out; the scope of the present invention may include other queuing sequences.

In a further embodiment, multiple functions may be queued with a common condition criteria. For example, test program controller 108 may configure signal error circuitry 202 with multiple functions, e.g., of the functions such as set busy bit, DRG bit, error bit, etc. of FIG. 6. During the queuing, a deter bit may be set to avoid release of pending functions while receiving other remaining functions to be combined with the common condition criteria. The deter bit, thus, may indicate that more functions may be received for combination within the queue.

Once all functions have been loaded within the stack, e.g., as may be associated with the common condition criteria, the deter bit may be released. The signal error circuitry 202 may then wait and monitor conditions of the drive model and/or main emulator to determine conditions matching the condition criteria. Upon determining such match, the plurality of functions associated with the common condition criteria may be released for performance—e.g., such as setting both the DRQ and BUSY bits. Accordingly, multiple errors may be emulated responsive to a common test vector criterion. Although, not shown specifically in FIG. 5, in one exemplary embodiment, the deter bit may reside in a bit location along-side the code or sub-code fields, e.g., as a part of the condition criteria.

In one exemplary embodiment, signal error circuitry 202 may receive mode inputs from test program controller 108 of the test system of a form as follows:

```
type ERROR_RECORD is record
    code         : integer;
    sub-code     : std_ulogic_vector (8 downto 0);
    function     : integer;
    sub-function : std_ulogic_vector (8 downto 0);
    deter        : boolean;
end record;
```

For this form, the code and sub-code expressions may assume the condition criteria of FIG. 5. The function and sub-function provisions may assume the functions of FIG. 6. And the deter operative field may provide signaling to allow stacking of multiple error functions prior to release for emulation.

It will be apparent to those skilled in this art that the illustrated embodiments are exemplary and that various changes and modifications may be made thereto as become apparent upon reading of the present disclosure. Accordingly, such changes and modifications are considered to fall within the scope of the appended claims.

For example, the above disclosure describes testing of a bridge-chip having an ATA/ATAPI type mass-storage interface, the described methods are also appropriate for testing alternative chips, devices or software systems directed to interfacing such mass-storage drives. Additionally, the scope of the present invention extends to an apparatus comprising a computer-readable medium containing computer instructions that, when executed, cause a processor or multiple communicating processors to perform one of the described test methods.

Further, the specification may refer to "an", "one", "another", or "some" embodiment(s) in various locations. It will be understood, however, that such use does not necessarily mean that each such reference is directed to the same embodiment(s), or that the features thereof only apply to a single embodiment.

What is claimed is:

1. A method of testing a bridge-chip, comprising:
simulating a storage device at an interface of the bridge-chip;
identifying a command from communications received over the interface; and
emulating an error for the simulating of the storage device dependent on the identifying.

2. The method according to claim 1, further comprising:
queuing errors to be emulated;
the emulating to emulate an error of the queue responsive to the identifying determining a predetermined command.

3. The method according to claim 2, in which
the queuing comprises associating condition criteria together with the errors; and
the emulating of one of the queued errors dependent on the condition criteria associated therewith.

4. The method according to claim 3, in which the queuing of errors queues a plurality of ATA/ATAPI type errors to be emulated responsive to a given condition criteria.

5. The method according to claim 3, in which the simulating comprises:
simulating ATA registers; and
simulating access of data storage of the simulated storage device responsive to information of the ATA registers; and
the condition criteria consists of at least one of a data state of the ATA registers and a condition of the simulated access of the data storage.

6. A bridge-chip tester comprising:
ATA registers to receive data from one of an ATA or ATAPI-type interface, the ATA registers including at least a command register and an error register;
an emulator to emulate data storage, the emulator responsive to commands of the command register;
a queue to queue-up error functions; and
a simulator to simulate errors of the queued error functions responsive to data of at least one of the command register and the emulator.

7. The bridge-chip tester according to claim 6, where the emulator emulates mass storage operable per at least one of an advance technology attachment (ATA) or an advance technology attachment packet interface (ATAPI) protocol.

8. The bridge-chip tester according to claim 7, further comprising a test controller to load the queue with condition criteria associated with the queued error functions, the queue to allow errors of the error functions to be simulated responsive to determining conditions of the emulator and registers that match the condition criteria.

9. The bridge-chip tester according to claim 6, further comprising:
a universal serial bus (USB) driver to drive a USB interface of the bridge-chip; and
a monitor to monitor signals of the ATA/ATAPI interface.

10. The bridge-chip tester according to claim 9, the monitor further to monitor operations of the bridge-chip responsive to error functions released from the queue.

11. The bridge-chip tester according to claim 6, the queue configurable to release multiple queued errors to be simulated responsive to a single condition criteria.

12. The bridge-chip tester according to claim 11, the queue operable to determine if data of at least one of the command registers and the emulator match the condition criteria, and to enable simulation of queued errors upon determining such match.

13. The bridge-chip tester according to claim 12, the queue further operable to queue-up a second error function of the queue stack after determining a condition criteria match and simulating an associated error.

14. A method of simulating a storage device, comprising:
emulating a storage device in communication with an ATA/ATAPI interface; and
simulating errors of the storage device responsive to at least one signal of the group consisting of ATA/ATAPI interface signals and signals associated with the emulating of the storage device.

15. The method according to claim 14, further comprising monitoring signals of the ATA/ATAPI interface.

16. The method according to claim 15, in which the emulating the storage device includes operating a plurality of registers to emulate ATA registers of the storage device.

17. The method according to claim 16, further comprising:
communicating with the plurality of registers and simulating mass storage procedures responsive to data of the ATA registers; and
conditioning the simulating of errors upon condition criteria of at least one of the emulated ATA registers and the simulated mass storage procedures.

18. The method according to claim 16, in which the simulating errors further comprises changing contents of an emulated ATA register responsive to signals that are associated with simulating the storage device configured to a predetermined condition criteria.

19. The method according to claim 14, further comprising simulating segmented errors of the storage device.

20. The method according to claim 19, further comprising conditioning the simulating of errors upon different respective condition criteria.

* * * * *